UNITED STATES PATENT OFFICE.

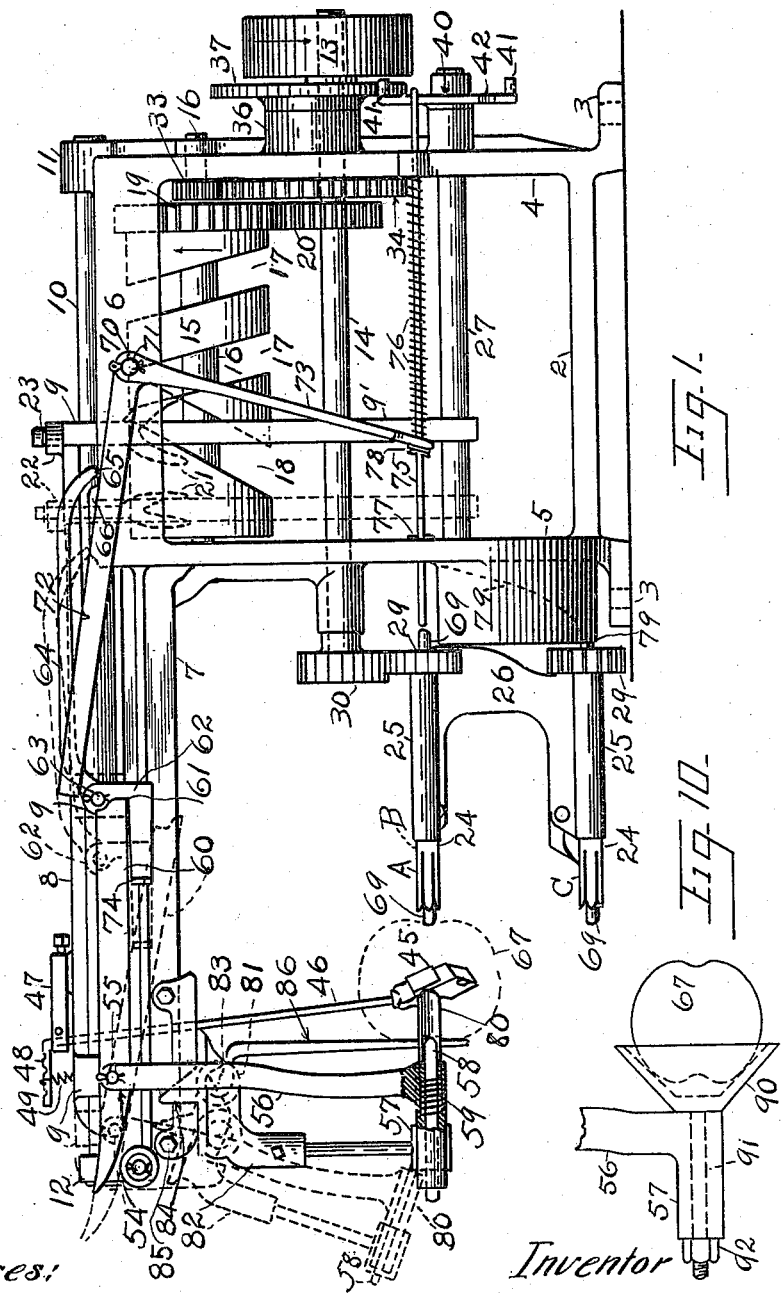

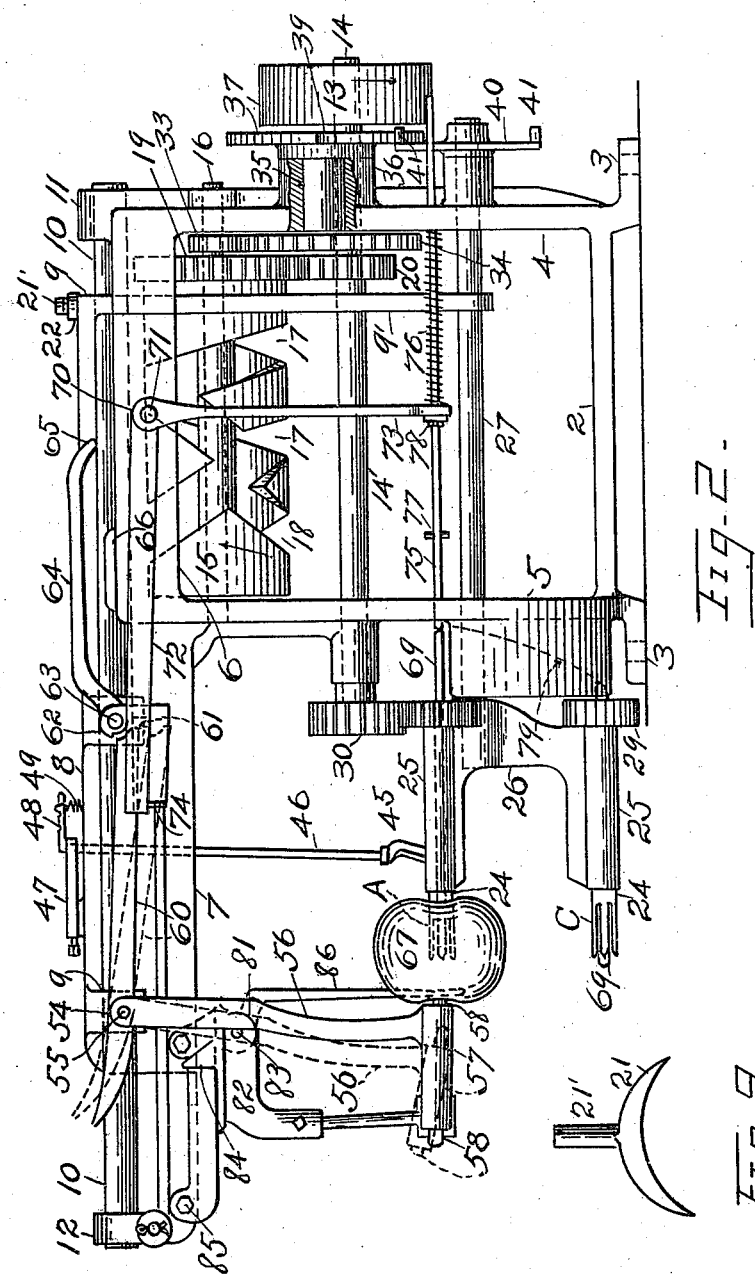

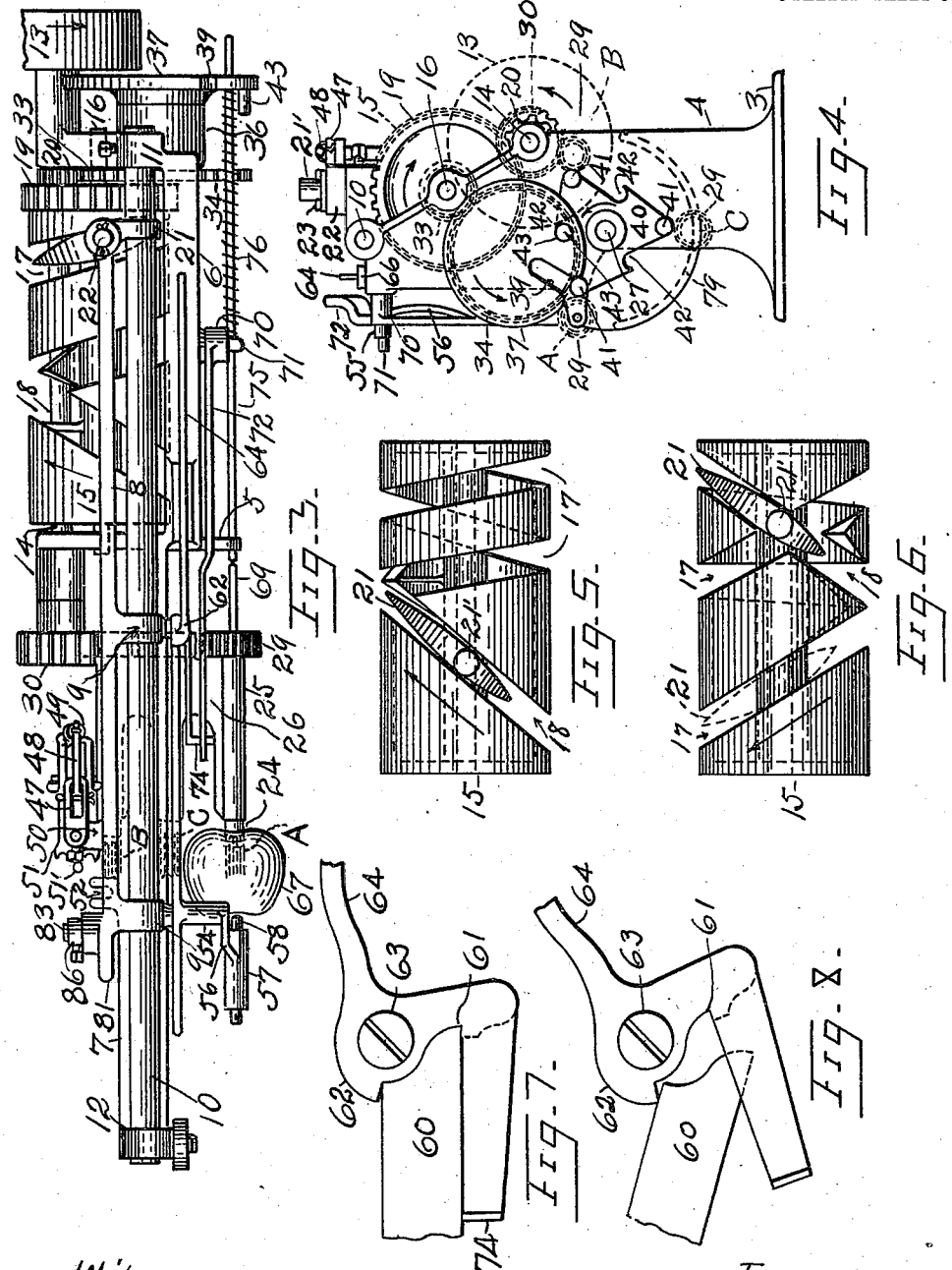

GEORGE W. GATES, OF FLINT, MICHIGAN.

FRUIT-PARER.

965,513.  Specification of Letters Patent.  Patented July 26, 1910.

Application filed December 18, 1909. Serial No. 533,811.

*To all whom it may concern:*

Be it known that I, GEORGE W. GATES, a citizen of the United States, residing at Flint, in the county of Genesee and State of Michigan, have invented certain new and useful Improvements in Fruit-Parers, of which the following is a specification.

This invention relates to improvements in fruit parers, and has for its object to provide an automatic loading mechanism arranged to work in conjunction with a novel fruit centering feature.

A further object is to provide a novel and simple mechanism for operating and controlling the carriage and other movable parts.

A further object is to lessen the number of working parts of the main device and at the same time to reduce the friction, jar and strain common to high speed power driven parers of the class.

Other features and parts of the invention will be readily understood from the detail description which follows, and by reference to the accompanying drawings which form a part of this specification, and in which—

Figure 1 is a front side elevation of the complete machine, showing in full lines the position of the several parts, as when an apple is being centered preparatory to loading the same upon one of the forks for paring; also showing by dotted lines the position of the carriage and related parts in full release, as after an apple is pared. Fig. 2 is a similar front side view, showing by full lines the position of the parts when the final act of loading the apple is accomplished; the dotted lines showing the released position of the loading lever. Fig. 3 is a top plan view showing the parts in same position as in Fig. 2. Fig. 4 is a head-end elevation of the parer, showing location of the driving parts; also location and arrangement of intermittent gears for rotating the fork reel. Fig. 5 is an enlarged plan view of the cylinder or drum cam which coöperates with the pivoted block for reciprocating the carriage; showing the block in single slot, as when about to complete the returning movement of the carriage. Fig. 6 is a view of the drum when rotated one-half turn from the position shown in Fig. 5. Fig. 7 is an enlarged detail view showing the loading lever in locked position. Fig. 8 is a similar view showing the loading lever released. Fig. 9 is a detail view of the cam block. Fig. 10 is a view of a modified form of one of the centering parts.

In the drawings, the frame for my paring machine consists of a base 2, flanged feet 3, upright portions 4 and 5 and top 6, all preferably made of metal cast in one part, and capable of being mounted upon any suitable platform or table.

7 represents an integral arm which is joined to the inner end 5 of the frame and is disposed horizontally. The arm 7 is provided as a support for the reciprocating carriage 8 which carries the paring knife and other parts. The carriage 8 is fitted with a series of perforated lugs 9 which receive and slide upon a stationary rod 10, one end of which is secured in a perforated lug 11 of the frame, the opposite end being secured in a lug 12 formed on the free end of arm 7. The carriage is also provided with an integral arm 9′ which extends downwardly and slides on the reel shaft which will later be described.

The machine is operated by power applied to a pulley 13 which is mounted upon the outer end of a driving shaft 14 which has its bearings in the upright portions 4 and 5 at the rear side of the frame.

15 represents a drum rotatably mounted on a stationary rod 16 which extends horizontally through the frame. The drum 15 is formed with an endless spiral slot, one portion of the slot—17, encircling the drum twice, and another portion of the slot—18 encircling the drum once.

19 represents a spur-gear rigidly mounted on the outer end of the drum, which meshes with and is driven by a smaller spur-gear 20 carried by the driving shaft 14.

The carriage 8 is operated reciprocally on the rod 10 by means of a crescent-shaped floating block or part 21 which is disposed in the slot 17—18 of the drum, and which is pivotally mounted in or suspended from the inner end of the carriage, by means of a shank 21′ and is held in place by a collar 22 and a cotter pin 23. Under this construction and arrangement of the part 21 it freely follows slots 17 and 18 when the drum is rotated. The arrows shown on the drum and pulley indicate the direction in which these parts are rotated.

The fruit to be pared, principally consisting of apples, is loaded upon a series of forks A, B and C, each of which forms one end of a hollow spindle 24, which has its bearing in a tubular sleeve 25 forming a part of the fork reel 26, the reel being rigidly mounted upon a shaft 27 which passes through the ends 4 and 5 of the frame in which the said shaft has its bearings. The opposite ends of the spindles 24 are fitted with spur-gears 29, which are arranged to mesh intermittently with a spur-gear 30 which is mounted on the inner end of the driving shaft 14.

The arrangement and disposition of the fork reel is such that while the fruit is being loaded upon the fork A, the fruit already loaded on the fork B is being pared, and at this time the gear 29 attached to the fork B is in mesh with the gear 30 and is rotated thereby. At the same time the fork C will have been shifted to the lower position, shown in Figs. 1 and 2, ready to take the place of fork A for loading, when the fork A is shifted into paring position, and its gear 29 is brought into mesh with the gear 30.

The intermittent operation of the fork reel is accomplished by a series of parts which I will now describe.

33 represents a spur-gear mounted upon the stationary shaft or rod 16 which carries the drum, and is preferably secured to the spur-gear 19 and driven thereby. Gear 33 drives another gear 34 which is mounted upon a shaft 35, which has its bearing in a hub 36 formed on the part 4 of the frame. Upon the outer end of the shaft 35 is mounted an intermittent gear 37 having a radial slot 39 formed in its circumferential edge. 40 represents another intermittent gear which is mounted upon the outer end of shaft 27, and is provided with three studs or pins 41, which project from the face of the gear, and which are spaced at equal distances from the center of the gear and also from each other. The star gear 40 is also provided with a series of hook-shaped notches 42 arranged at regular intervals, alternating with the studs 41, which are adapted to be engaged by a pin 43 which projects from the inner face of the gear 37. The arrangement of the gears 37 and 40 is such, that once during each revolution of the gear 37 the pin 43 engages one of the hooks 42 of the gear 40, and partially rotates said gear, and by this movement one of the pins 41 of the gear 40 is thrown into the slot 39 of gear 37, and the latter gear then completes the one-third turn movement of the gear 40, carrying said gear around until pin 41 passes out of the slot 39. The last described operation of the intermittent gears 37 and 40 effects the rotation of the fork reel one-third of a turn, which, for example, shifts the loaded fork A into operative connection with the gear 30 for paring the fruit, and at the same time shifts the fork B from the paring position to the idle position indicated by C in Figs. 1 and 2. Each time while an apple is being loaded, another apple is being pared, and the mechanism, including the intermittent gears, is so timed that the gear 37 makes but one revolution while an apple is being pared, the gear 40 remaining still during the paring period. As soon as the paring is completed the gears 37 and 40 will again be in position to rock the reel 26 one-third of a turn for a subsequent loading and paring. This latter operation takes place during the interval in which the carriage is being returned.

The paring knife 45 is preferably constructed in the usual form for power parers, and is secured to the lower end of a rod 46, which passes through a slotted part 47, its upper end being bent at right angles to the rod to form a graduated tension arm 48, to which one end of a spring 49 is connected, and by means of which the knife is rendered yieldable to a sufficient extent to properly perform the act of paring fruit of unequal size and irregular form. The part 47 is pivotally mounted upon a lug 50 of the carriage and travels back and forth with the same. The knife is partially rotated, that it may follow the surface of an apple, by means of the usual turn-table 51, having a projection 51', which engages a notch 52 formed on the rear side of arm 7 of the frame. As the carriage moves in either direction on rod 10, the turn-table is rotated correspondingly, and the knife is carried through the paring movement, or reversed, as the case may be. The carriage moves forward and back, making a return trip for each paring operation. During the same interval the drum 15 makes three full revolutions,— two revolutions while the knife is paring the apple, then one revolution for the reversing or returning of the carriage to make ready for another paring. As it requires some little time to effect the complete paring of an apple, the carriage is carried to the right with a rather slow movement. This is accomplished by the two-turn slot 17. In order to save time, the return movement of the carriage is effected by but one revolution of the drum, and at this time the block 20 traverses the single turn slot 18. In Fig. 5 the block 21 is shown in the single turn slot 18 as it appears when about to finish its leftward travel which carries the carriage to the position shown by dotted lines in Fig. 1. In Fig. 6 the full lines show the block 21, as when entering the single slot 18 immediately after an apple is pared, at which times the carriage and all the parts are in the position shown by full lines in Fig. 2, excepting that the block in Fig. 2 is shown as when completing the paring movement. The dotted lines in Fig. 6 show the position of block 21 at the times the fruit is being centered.

Heretofore, in all power paring machines, so far as I am aware, the apples or fruit have been loaded or forced on to the forks by hand, requiring a strong operator, and as the machines are supposed to pare 25 or 30 apples per minute, it requires a quick action, a steady aim, and great force to center and load the hard fruit in a manner to insure proper paring. In order to remedy this difficulty, and at the same time simplify the operation, as well as to increase the efficiency and output of fruit parers of the class, I have provided a novel, simple and effective fruit centering and loading attachment, which I will now describe.

54 represents a bell-crank lever of peculiar form, pivotally mounted on the side of the carriage near the outer end, by a pin or stud 55. The depending arm 56 is made with a cylindrical portion 57 which is bored out to receive a centering plunger 58, which is yieldably disposed therein by means of a coil spring 59 (see Fig. 1). The pin or plunger 58 is arranged concentric to the fork when the latter is brought into loading position. The horizontal arm 60 of lever 54 is disposed parallel to the carriage and its free end is arranged to engage a shoulder 61 of a latch 62, which is pivoted to the center lug 9 of the carriage by a stud 63. The latch 62 is provided with a tail 64, which is positioned over the top portion 6 of the frame, and is so constructed and disposed that when the tip 65 of the tail rests upon the surface of part 6, (as in Fig. 1) the arm 60 of lever 54 will be held in locked or rigid position, as shown in Figs. 1 and 7, (as during the period of paring) and when the carriage is reversed after each apple is pared, to the position shown by dotted lines in Fig. 1, the tip of the tail 64 is brought to a slightly elevated position by means of a raised portion 66 on part 6 (see Fig. 1). When the latch is in the latter position arm 60 of lever 54 will be released or unlocked and may be swung out of engagement with the catch 61, as shown in Figs. 1 and 8.

To center an apple preparatory to loading the same on a fork, as soon as one of the forks is shifted to the position indicated at A in Fig. 1, concentric to the centering pin 58, the operator elevates an apple, as indicated by the dotted lines in Fig. 1, poising the apple with its depressed ends in line with the plunger 58, and also in line with a core ejecting plunger 69, which is loosely disposed in the hollow spindle 24. When the apple is brought into the position last described, the end of pin 58, and one end of pin 69, which projects slightly beyond the points of the fork A, readily enter the depressions in the opposite ends of the apple as the carriage moves to the right, and effects the perfect centering of the fruit. This latter operation requires but a second's time.

In the meantime the carriage continues the movement from left to right by the rotation of the drum 15 and its connection with the block 21, which during this interval is traversing the two-turn slot 17 of the drum. As soon as the apple is centered the cylinder 57 of lever 54 continuing its movement to the right forces the apple on to the fork, thereby loading it, as shown in Figs. 2 and 3. When cylinder 57 begins to exert its force against the apple, the plunger 58 is forced to the left into the cylinder against the tension of the spring 59, and the end of the cylinder then drives the apple on to the fork. As soon as the apple is loaded properly on the fork, the next step in the cycle of operation is to effect the relaxing of the pressure of lever 54 against the apple, which occurs at varying times or points in the travel of the carriage and lever 54 at each loading period. This provision is made so that whether an apple is large or small, it will be loaded on to the fork in the same manner and to the same extent and thus insure the perfect paring of the fruit. In order to properly gage the loading of the fruit upon the forks, I provide a second bell-crank lever 70, which is pivoted to part 6 of the frame at 71, and having arms 72 and 73. Arm 72 of lever 70 is disposed parallel to the front side of the frame and also to the carriage 8 and latch 62, in position to engage a trip-arm 74 carried by the latch, and which projects outwardly into the path of arm 72. The arm 73 of trip-lever 70 extends downwardly some distance and its free end is slotted to receive a reciprocating rod 75, which passes loosely through parts 4 and 5 of the frame. The rod 75 is positioned concentric to the centering pin 58 of lever 54, and also concentric to the core-ejecting plunger 69, when each fork in regular order is brought into loading position, as indicated at A. The arrangement of the rod 75 is such that it is normally held by a spring 76, with its left or inner end projecting through the part 5 of the frame sufficiently to engage the end of the plunger 69, when the latter is in the position shown in Figs. 1, 2 and 3. A stop pin 77 carried by the rod 75, limits the leftward movement of said rod, and another like pin 78 drives the trip lever 70 to the right, (as shown in Fig. 2) when the rod is forced in that direction by the ejecting pin 69. Then at the proper time spring 76 returns both lever 70 and the rod 75 to the left, or normal position. During the interval in which the apple is being centered the levers 54 and 70 stand in the position illustrated in full lines in Fig. 1. As soon as the apple is centered the operator lets go, and the carriage moves on to the right. Lever 54 at this time becomes locked by gravity in latch 62, this action being permitted by the tail 64 descending from the ledge 66 which permits of the gravitating of the latch 62 to locking position shown in Figs. 1 and 7 and as all of the said parts are traveling with the carriage, the cylinder 57 forces the apple on to the fork, (see Figs. 2 and 3). As the apple is pierced by the prongs of the fork, the hard core of the apple forces the ejecting plunger 69 to the right through the spindle 24 (see Figs. 2 and 3). The opposite end of plunger 69 being then in engagement with the inner end of rod 75, forces said rod to the right against the tension of springs 76, and stop 78 rocks the trip-lever 70 in such a manner as to cause its arm 72 to swing downwardly in time to engage the trip-arm 74 of latch 62, as the latch glides beneath it, and tilts the latch sufficiently to unlock the arm 60 of lever 54 (see Figs. 2 and 3), thereby relieving the pressure exerted by cylinder 57 against the apple. The loading of the different sized apples to the same extent upon each of the forks is essential, for the reason that the position of the forks never changes except by the rotary motion of the reel, and each fork in its turn is brought to the same position for paring. The knife is arranged to engage the apple as soon as a fork is shifted from the loading to the paring position, and the knife is also so adjusted that it will pare apples of any size without change.

During the same time an apple is being centered and loaded, and the tripping of the parts last described is taking place, the knife 45 is engaged in paring an apple held by the previously loaded fork, and instantly the loading and paring work is done, the reel 26 is again rocked one-third of a turn by the intermittent gears 37 and 40. This movement of the reel carries the projecting end of plunger 69 over the face of a cam 79 formed on part 5 of the frame. The cam 79 forces ejecting plunger 69 to the left through the spindle 24 until its opposite end projects slightly beyond the points of the fork, and in doing this ejects or discharges the core which remains on the fork after the apple has been pared. When the reel is rotated to shift the loaded apple into paring position ejecting pin 69 moves out of line and engagement with rod 75, and then spring 76 forces said rod and also lever 70 back to the position shown in Fig. 1, ready for the next loading operation.

The usual coring blade 80 is provided and is suspended from a downwardly projecting lug 81 of the carriage, the blade being directly supported by a rocking or tipping part 82 which is pivoted at 83 to the lug 81. The tipping part 82 is provided in the usual manner with an upwardly projecting shoulder 84, which engages a stud 85 rigid on arm 7 of the frame when the carriage is moved to the left to the full limit of its travel. The engagement of the shoulder 84 with the stud 85 tips the coring blade 80 to the position shown by dotted lines in Fig. 1. The coring blade is arranged to pierce the apple while the latter is being pared, and the apple remains on the coring blade when it is removed from the fork. The reversing of the carriage carries the coring blade with the apple to the left, and the apple is then removed from the blade by means of a stripper rod 86 which depends from the lug 81.

Fig. 10 illustrates a modified form of the centering device carried by the lever 56, which consists of a bell or cone shaped part 90, arranged to receive one end of the apple or other fruit, the centering being effected by the hollow cone engaging the periphery, rather than the depression at the end of the apple. The cone or bell 90 is formed on a stem 91 which passes through cylinder 57 of lever 56 in the same manner as the pin 58, except that the spring 59 is omitted, and a nut 92 is applied to the threaded free end of the stem, for rigidly holding this centering part in place. Lever 56 and cylinder 57 need not be altered for the interchanging of the two forms of centering parts. By using this device instead of the yielding pin 58, apples of any size or form may be truly and conveniently centered. The cone 90 should be made large enough to receive fruit of varying sizes, and as the cores of apples are not always truly central with the body, this modified form of the device insures a more accurate centering, and the subsequent paring will be more perfectly and neatly done. The cone centerer is especially adapted for paring apples for canning, where the machine is not relied upon for removing the cores in the same manner as where the fruit is prepared for evaporating.

No invention is claimed for the reel and its forks, nor for the paring knife, coring blade and their related parts. The essentially novel features of my invention consist principally of the centering and loading mechanism, together with the novel arrangement of the carriage, operating and timing parts. In the present device the power is applied directly to the driving or paring shaft, and from this shaft the power is communicated to the drum and intermittent reel-shifting gears, the latter being located on the head of the machine within easy reach of the attendant, and removed to a point where they are free from contact with operator as well as the juice and other refuse.

By the employment of the drum cam provided with the spiral slot making two turns in one direction and one turn in the other,—three turns in all, to each paring and loading operation,—I am able to provide an easy cam spiral which requires less power, and at the same time lessens the friction and jar of the machine, as compared with similar cams used on the older devices.

The novel fruit centering and loading feature of the present invention lightens the work of the operator, insures greater safety, and renders the machine capable of paring a greater amount of fruit in the same time in a more perfect manner, because correctly centered, and with less power, than any other machine of the class known to me.

Having thus described my invention, what I claim as new and desire to secure by Letters Patent, is—

1. In a fruit parer, the combination with a frame and a driving shaft, of a drum operatively connected to said shaft, said drum having an endless spiral cam slot, said slot encircling the drum twice in one direction, and once in the opposite direction, a carriage, the said carriage operated reciprocally by means of a block disposed in the slot of said cam, a fruit centering and loading lever carried by said carriage, a yielding centering pin carried by said lever, a latch to hold said lever in rigid position while centering and loading the fruit, and a tripping lever carried by the frame adapted to release said centering and loading lever after each loading of the fruit.

2. In a fruit parer, the combination with a frame and a reciprocating carriage, of a fruit centering and loading mechanism comprising a bell-crank lever pivoted to said carriage and having an arm disposed in position to engage the fruit for centering and loading the same, a latch carried by said carriage adapted to lock and hold said lever in rigid position while the fruit is being centered and loaded, and a tripping lever pivoted to said frame, adapted to trip said latch for relaxing the pressure of said first lever against the fruit at the end of each loading action.

3. In a fruit parer, the combination with a drum having an endless spiral cam slot, and a reciprocating carriage supporting a fruit paring mechanism, of a floating block pivoted to said carriage and disposed in the slot of said drum, whereby as the said drum rotates continuously in one direction said carriage is made to operate reciprocally at different speeds, a fork reel connected for intermittent operation with said drum, a bell-crank carried by said carriage, a fruit centering mechanism consisting of a centering pin carried by said bell-crank lever and a core-ejecting plunger carried by said fork reel, a fruit loading mechanism comprising said bell-crank lever and a coöperating latch carried by said carriage, and a trip lever for breaking the operative connection between said bell-crank lever and said latch at the end of each loading operation, the said tripping lever being actuated by said core-ejecting plunger.

4. In a fruit parer, the combination with a frame and a reciprocating carriage, of a driving-shaft mounted in said frame, a constantly rotating drum cam driven by said shaft for operating said carriage, a bell-crank lever pivoted to said carriage and movable therewith, a yieldable fruit centering plunger carried by said lever, a reel having a plurality of fruit forks, a yieldable pin carried by each fork, a latch carried by said carriage for locking said lever in rigid position for loading the fruit, a trip lever pivoted to said frame adapted to unlock said bell-crank lever at the end of each loading movement thereof, and means for rocking said trip lever.

5. In a fruit parer comprising a frame, a driving shaft carried by said frame, a drum mounted in said frame and driven constantly by said shaft, said drum having an endless spiral slot, a knife carriage mounted on said frame, a floating block pivotally connected to said carriage and disposed in the spiral slot of said drum, adapted to move the carriage reciprocally by the rotation of said drum, a reel having a plurality of forks, a train of gears connecting with said drum for intermittently operating said reel, a fruit loading lever carried by said carriage, a fruit centering plunger carried by said lever, a core-ejecting pin carried by each fork of said reel, the core-ejecting pins adapted to be brought into position concentric to said centering plunger sequentially by the intermittent rocking of said reel for centering and loading the fruit upon said forks, a latch to hold said loading lever rigidly during the centering and loading of the fruit, and a trip-lever actuated by said core-ejecting pin for releasing said loading lever.

6. In a fruit parer, the combination with a frame and a reciprocating carriage, of a fruit centering and loading mechanism, comprising a bell-crank lever pivoted to said carriage, having an arm disposed in position to engage the fruit for centering and loading the same, a latch carried by said carriage adapted to lock and temporarily hold said lever in rigid position while the fruit is being centered and loaded, a second bell-crank lever pivoted to said frame adapted to trip said latch for relaxing the pressure of said first lever against the fruit at the end of the loading action, a plunger for operating said second lever in one direction, and a spring for normally holding said second lever out of engagement of said latch.

7. In a fruit parer, a frame, a knife carriage, a floating cam block carried by said carriage, a drum having an endless spiral cam slot to receive said floating block, said spiral slot extending three times around the drum, and arranged so that two revolutions of the drum moves the carriage in the direction for paring the fruit and a third revolution of the drum moves the carriage in the opposite direction for starting a subsequent paring, a reel having a plurality of fruit forks, a train of gears for rocking said reel intermittently, a core-ejecting plunger carried by each fork, a loading lever carried by said carriage, a centering-pin carried by said loading lever, adapted to coöperate with said core-ejecting plunger for centering the fruit preparatory to loading the same on to a fork, a latch carried by the carriage for holding said loading lever rigid during the centering and loading of the fruit, a trip lever actuated by the core-ejecting plunger for breaking the connection between said latch and said loading lever for relaxing the pressure of said lever against the fruit, and a spring to restore and normally hold said tripping lever in position to be successively engaged by said core-ejecting plungers.

8. In a fruit parer, the combination with a frame and a reciprocating carriage, of a cam drum mounted in said frame and operatively connected to said carriage, a driving shaft to operate said drum, a fruit centering mechanism comprising a bell-crank lever supported by said carriage, a yieldable plunger carried by said lever, a reel having a plurality of fruit forks, and a core-ejecting pin carried by each fork adapted to coöperate with said plunger for centering the fruit.

9. In a fruit parer, the combination with a frame and a reciprocating carriage supporting a fruit paring mechanism, of a fruit loading mechanism comprising a bell-crank lever pivotally carried by said carriage having a depending arm formed with a cylinder, a reel fitted with a number of forks, each of said forks brought concentric to the cylinder of said lever by the intermittent rocking of said reel, for loading fruit upon one of the forks during each reciprocating movement of the carriage, and a latch to hold said bell-crank rigid during the loading of the fruit.

10. The combination with a cam drum and a reciprocating knife carriage, of a fruit loading mechanism comprising a lever pivoted to the carriage and movable therewith, a reel fitted with a plurality of fruit forks, each fork adapted by the intermittent operation of said reel, to be positioned concentric to a cylinder carried by said lever, means on which the fruit is centered between the cylinder of said lever and one of said forks, and a latch for holding said lever rigid for forcing the fruit onto the fork.

11. The combination with a cam drum and a reciprocating knife carriage, of a fruit loading mechanism comprising a lever pivoted to the carriage and movable therewith, a reel fitted with a plurality of fruit forks, each fork in sequential order adapted to be positioned concentric to a cylinder carried by said lever, means on which the fruit is centered between the cylinder of said lever and one of said forks, a latch for holding said lever rigid for forcing the fruit onto the fork, and means for throwing said latch out of locking engagement with said lever after each loading operation.

12. In a fruit parer, the combination with a frame and a knife carriage, of a drum operatively connected with said carriage, said drum having an endless spiral cam slot, said slot encircling the drum twice for operating the carriage in the direction for paring fruit, said slot encircling the drum a third time for reversing said carriage, a reel having a number of fruit forks arranged for intermittent rotation during the reversing of said carriage, a fruit centering mechanism comprising a bell-crank lever carried by said carriage, one arm of said lever depending and fitted with a cylinder, a centering pin yieldably fitted in said cylinder, said pin and said cylinder positioned to coincide with the axes of said forks as each fork comes to rest at the loading point, a core-ejecting plunger carried by each fork, said plungers coöperating with said pin for centering the fruit, a latch for holding said bell-crank lever rigid for loading the fruit onto the fork after it has been centered, and a trip-lever for releasing said bell-crank, the said trip-lever actuated by the core-ejecting plunger, and said plunger actuated by the fruit during the final loading movement.

13. In a fruit parer, the combination with a frame, a reciprocating carriage and a fork reel, of a drum cam mounted in said frame and operatively connected with said carriage, a driving shaft to operate said drum and said reel, a fruit centering mechanism comprising a bell-crank lever supported by said carriage, a yieldable plunger carried by said lever, and a yieldable pin carried by each fork of said reel, the said plunger and said pin coöperating for centering the fruit.

In testimony whereof I affix my signature in presence of two witnesses.

GEORGE W. GATES.

Witnesses:
C. C. VAN WAGONER,
CHAS. C. FRICK.